United States Patent
Koga et al.

(10) Patent No.: US 7,137,247 B2
(45) Date of Patent: Nov. 21, 2006

(54) REGENERATION APPARATUS AND METHOD FOR PARTICULATE FILTER APPLICABLE TO ENGINE EXHAUST GAS PURIFYING DEVICE

(75) Inventors: Toshimasa Koga, Yokohama (JP); Junichi Kawashima, Kanagawa (JP); Makoto Otake, Yokohama (JP); Naoya Tsutsumoto, Yokohama (JP); Terunori Kondou, Yokohama (JP); Takao Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/752,518

(22) Filed: Jan. 8, 2004

(65) Prior Publication Data

US 2004/0139733 A1 Jul. 22, 2004

(30) Foreign Application Priority Data

Jan. 10, 2003 (JP) ............................. 2003-004965

(51) Int. Cl.
*F01N 3/00* (2006.01)
(52) U.S. Cl. ............................. 60/295; 60/274; 60/278; 60/280; 60/285; 60/286; 60/297; 60/311
(58) Field of Classification Search .................. 60/285, 60/295, 297, 311, 274, 278, 280, 286, 303
See application file for complete search history.

(56) References Cited

U.S. PATENT DOCUMENTS

| | | | |
|---|---|---|---|
| 5,287,698 A | * | 2/1994 | Shinzawa et al. ............. 60/286 |
| 5,319,930 A | * | 6/1994 | Shinzawa et al. ............. 60/286 |
| 6,032,461 A | | 3/2000 | Kinugasa et al. |
| 6,304,815 B1 | * | 10/2001 | Moraal et al. ............... 701/115 |
| 6,622,480 B1 | * | 9/2003 | Tashiro et al. ................. 60/295 |
| 6,708,487 B1 | * | 3/2004 | Morimoto et al. ............. 60/311 |
| 2004/0074225 A1 | | 4/2004 | Schaller et al. |

FOREIGN PATENT DOCUMENTS

DE 100 33 158 C1 12/2001

(Continued)

OTHER PUBLICATIONS

U.S. Appl. No. 10/756,502, filed Jan. 14, 2004, Kondou et al.

(Continued)

*Primary Examiner*—Thomas Denion
*Assistant Examiner*—Diem Tran
(74) *Attorney, Agent, or Firm*—Foley & Lardner LLP

(57) ABSTRACT

In regeneration apparatus and method for a particulate filter that collects a particulate in exhaust gas of an internal combustion engine, a timing at which an accumulated particulate is combusted to regenerate the particulate filter is determined and a control is performed for a combustion of the particulate, during the control for the combustion of the particulate, a temperature of the engine exhaust gas is raised to a first target temperature set at a temperature equal to or higher than a criterion temperature which provides a criterion of whether the particulate is combusted to regenerate the particulate filter when the engine falls in a first driving region, and the engine exhaust gas temperature is raised to a second target temperature set at a temperature lower than the criterion temperature when the engine falls in a second driving region different from the first driving region.

16 Claims, 6 Drawing Sheets

FOREIGN PATENT DOCUMENTS

| | | |
|---|---|---|
| DE | 100 33 159 A1 | 1/2002 |
| DE | 100 56 016 A1 | 5/2002 |
| EP | 1 108 876 A2 | 6/2001 |
| EP | 1 245 813 A2 | 10/2002 |
| JP | 03-011142 A | 1/1991 |
| JP | 2000-179326 A | 6/2000 |
| JP | 2002-180816 A | 6/2002 |
| JP | 2002-250218 A | 9/2002 |
| WO | WO 97/16632 A1 | 5/1997 |

OTHER PUBLICATIONS

U.S. Appl. No. 10/755,316, filed Jan. 13, 2004, Otake et al.
U.S. Appl. No. 10/752,519, filed Jan. 8, 2004, Koga et al.
U.S. Appl. No. 10/751,940, filed Jan. 7, 2004, Inoue et al.
U.S. Appl. No. 10/751,883, filed Jan. 7, 2004, Inoue et al.
Patent Abstracts of Japan, vol. 2002, No. 02, Apr. 2, 2002, JP 2001-303980, Oct. 31, 2001.

* cited by examiner

REGENERATION APPARATUS AND METHOD FOR PARTICULATE FILTER APPLICABLE TO ENGINE EXHAUST GAS PURIFYING DEVICE

BACKGROUND OF THE INVENTION

1. Field of the Invention

The present invention relates to regeneration apparatus and method for a particulate filter used for a post process of an exhaust gas of, mainly, a Diesel engine and an exhaust gas purifying device using the regeneration apparatus and method described above.

2. Description of the Related Art

A Diesel particulate filter is a particulate trap (or collection) device constituted by molding a ceramic to a honeycomb-like monolithic and, generally, is used to remove a particulate matter (hereinafter, referred to simply as a particulate) exhausted from the Diesel engine. During a drive of the Diesel engine, the particulate is progressively accumulated as the time has passed. If the accumulated quantity of the particulate is in excess of an allowance quantity, a filter clog occurs and exhaust (gas) pressure is raised so as to give an ill influence on a driveability. It is, therefore, necessary to remove the accumulated particulate at a regular time interval from the exhaust gas so as to prevent the filter clog from occurring.

A Japanese Patent Application First Publication No. 2000-179326 published on Jun. 27, 2000 exemplifies a previously proposed regeneration method for a Diesel particulate filter in which the particulate is combusted and removed and by operating an engine control device such as injectors so that a temperature of the exhaust gas is raised up to a temperature value higher than that in an ordinary time and the particulate accumulated is heated up to a temperature equal to or higher than a combustion temperature. In the disclosed regeneration method, the exhaust gas temperature is raised from a time at which it is determined to be a time for the Diesel particulate filter to be regenerated to a time at which the particulate has combusted and its accumulation quantity has sufficiently been decreased so that it is expected that the Diesel particulate filter is deemed to have been regenerated. A target temperature of the exhaust gas to be reached to during this time period is set to a temperature such as 600° C. as high as a temperature required for an active combustion of the particulate. A method to raise the temperature of the exhaust gas to such a target temperature as described above is that injectors as the engine control device are operated on the Diesel engine in which a fuel injection is distributed a plurality of number of times and an injection timing of a post injection to be carried out after a main injection is retarded than that in the ordinary time.

SUMMARY OF THE INVENTION

However, when the Diesel engine driving condition falls in an idling region or low speed traveling region in which the temperature of the exhaust gas is naturally low, only the operation of the engine control device cannot reach the exhaust gas temperature to the above-described target temperature. Hence, when the Diesel engine driving condition falls in the above-described drive region, even if a determination that it is the time for the Diesel particulate filter to be regenerated is made, the operation of the engine control device cannot instantaneously cope with this determination. Because of this, the particulate is continuously accumulated and the exhaust gas pressure is furthermore raised. In addition to this, there is often a case where when, upon the determination that the engine driving condition falls out of the above-described region, the regeneration process for the particulate filter is tried to be carried out, the accumulated quantity of the particulate becomes excessive. On the other hand, if the exhaust gas temperature is forced to be raised in order to regenerate the Diesel particulate filter in spite of the fact that the engine falls in the low traveling speed region (or idling region), a retardation angle value of the post injection corresponding to the temperature rise in the exhaust gas becomes excessive and the injected fuel is mixed into a lubricating oil in a case where the injection timing of the post injection is retarded.

It is, therefore, an object of the present invention to provide regeneration apparatus and method for the particulate filter applicable to a Diesel engine which can prevent an excessive rise in the exhaust gas pressure with a further accumulation of the particulate suppressed without ill effect of the raising of the exhaust gas temperature on a dilution of the lubricating oil and can protect the particulate filter from a thermal load by raising the temperature of the exhaust gas to the temperature required for the combustion of the particulate corresponding to a flow of the exhaust gas into the particulate filter as a countermeasure against a case where the exhaust gas temperature is difficult to be raised to the temperature required for the active combustion of the particulate.

According to a first aspect of the present invention, there is provided a regeneration apparatus for a particulate filter that collects a particulate in exhaust gas of an internal combustion engine, the regeneration apparatus comprising: a regeneration timing determining section that determines a timing at which an accumulated particulate is combusted to regenerate the particulate filter; and a regeneration mode controlling section that performs a control for a combustion of the particulate, the regeneration mode controlling section including: a first exhaust gas temperature raising section that raises a temperature of the engine exhaust gas to a first target temperature set at a temperature equal to or higher than a criterion temperature which provides a criterion of whether the particulate is combusted to regenerate the particulate filter when the engine falls in a first driving region; and a second exhaust gas temperature raising section that raises the engine exhaust gas temperature to a second target temperature set at a temperature lower than the criterion temperature when the engine falls in a second driving region different from the first driving region.

According to a second aspect of the present invention, there is provided a regeneration apparatus for a particulate filter that collects a particulate in exhaust gas of an internal combustion engine, the regeneration apparatus comprising: a regeneration timing determining section that determines a timing at which an accumulated particulate is combusted to regenerate the particulate filter; and a regeneration mode controlling section that performs a control for a combustion of the particulate, the regeneration mode controlling section including: a first exhaust gas temperature raising section that raises an exhaust gas temperature to a first target temperature set at a temperature to combust the particulate to decrease an accumulation quantity of the particulate in the particulate filter when the engine falls in a first driving region; and a second exhaust gas temperature raising section that raises the exhaust gas temperature to a second target temperature set at a temperature to combust the particulate whose quantity is approximately the same as a quantity of the particulate which flows into the particulate filter when the engine falls in a second driving region different from the first driving region.

According to a third aspect of the present invention, there is provided a regeneration method for a particulate filter that collects a particulate in exhaust gas of an internal combustion engine, the regeneration method comprising: determining a timing at which an accumulated particulate is combusted to regenerate the particulate filter; and performing a control for a combustion of the particulate, the performing of the control for the combustion of the particulate including: raising a temperature of the engine exhaust gas to a first target temperature set at a temperature equal to or higher than a criterion temperature which provides a criterion of whether the particulate is combusted to regenerate the particulate filter when the engine falls in a first driving region; and raising the engine exhaust gas temperature to a second target temperature set at a temperature lower than the criterion temperature when the engine falls in a second driving region different from the first driving region.

According to a fourth aspect of the present invention, there is provided a regeneration method for a particulate filter that collects a particulate in exhaust gas of an internal combustion engine, the regeneration method comprising: determining a timing at which an accumulated particulate is combusted to regenerate the particulate filter; and performing a control for a combustion of the particulate, the performing of the control of the combustion of the particulate including: raising an exhaust gas temperature to a first target temperature set at a temperature to combust the particulate to decrease an accumulation quantity of the particulate in the particulate filter when the engine falls in a first driving region; and raising the exhaust gas temperature to a second target temperature set at a temperature to combust the particulate whose quantity is approximately the same as a quantity of the particulate which flows into the particulate filter when the engine falls in a second driving region different from the first driving region.

According to a fifth aspect of the present invention, there is provided an exhaust gas purifying device for an internal combustion engine, comprising: a particulate filter, disposed within an exhaust passage of the engine, to collect a particulate in exhaust gas of the engine; and a regeneration apparatus to regenerate the particulate filter, the regeneration apparatus comprising: a regeneration timing determining section that determines a timing at which an accumulated particulate is combusted to regenerate the particulate filter; and a regeneration mode controlling section that performs a control for a combustion of the particulate, the regeneration mode controlling section including: a first exhaust gas temperature raising section that raises a temperature of the engine exhaust gas to a first target temperature set at a temperature equal to or higher than a criterion temperature which provides a criterion of whether the particulate is combusted to regenerate the particulate filter when the engine falls in a first driving region; and a second exhaust gas temperature raising section that raises the engine exhaust gas temperature to a second target temperature set at a temperature lower than the criterion temperature when the engine falls in a second driving region different from the first driving region.

According to a sixth aspect of the present invention, there is provided an exhaust gas purifying device for an internal combustion engine, comprising: a particulate filter, disposed within an exhaust passage of the engine, to collect a particulate in exhaust gas of the engine; and a regeneration apparatus to regenerate the particulate filter, the regeneration apparatus comprising: a first exhaust gas temperature raising section that raises an exhaust gas temperature to a first target temperature set at a temperature to combust the particulate to decrease an accumulation quantity of the particulate in the particulate filter when the engine falls in a first driving region; and a second exhaust gas temperature raising section that raises the exhaust gas temperature to a second target temperature set at a temperature to combust the particulate whose quantity is approximately the same as a quantity of the particulate which flows into the particulate filter when the engine falls in a second driving region different from the first driving region.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
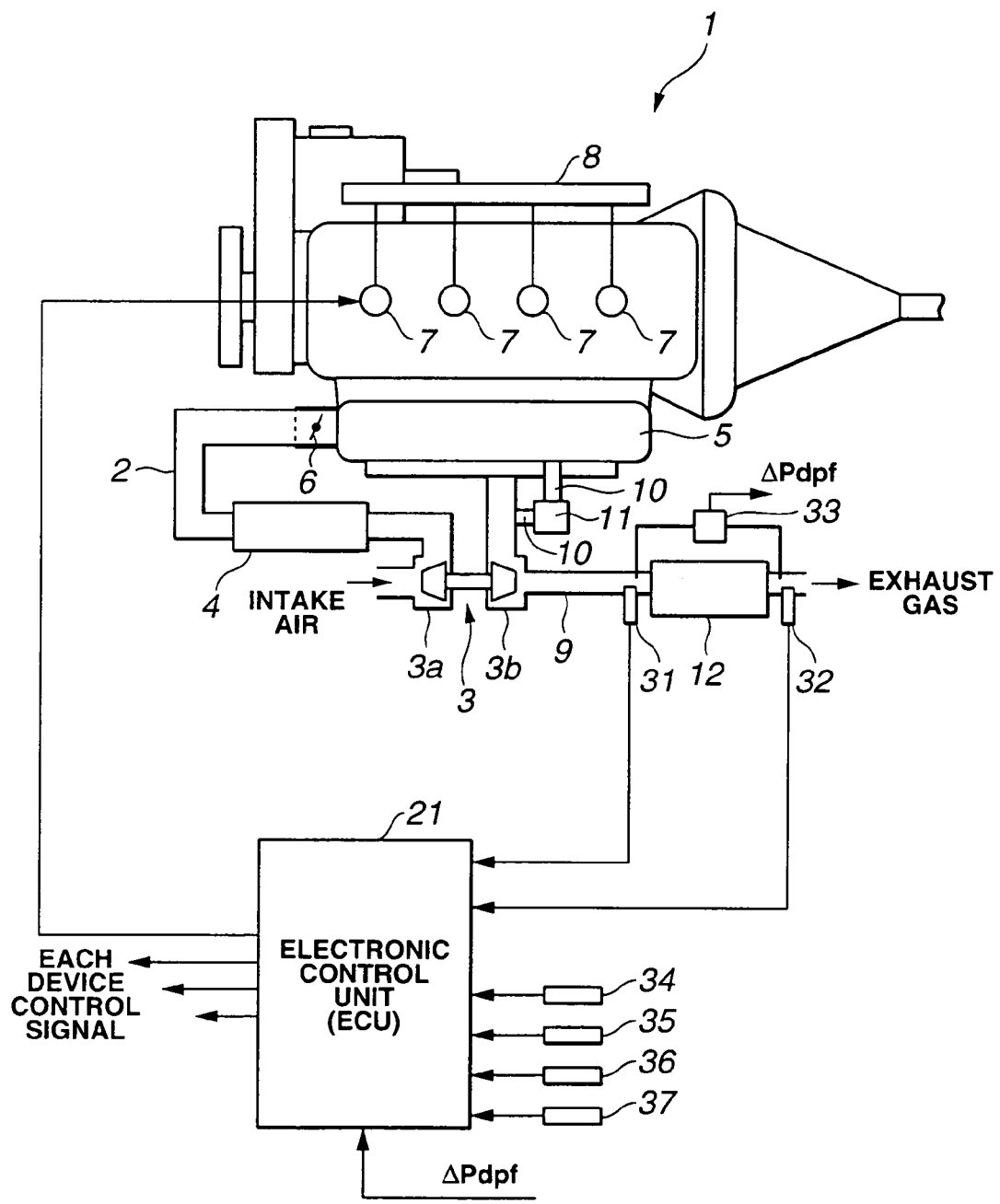
FIG. 1 is a schematic block diagram of a Diesel engine to which a particulate filter regeneration apparatus in a first preferred embodiment according to the present invention is applicable.

FIG. 1 shows a schematic configuration view of a direct injection Diesel engine 1 (hereinafter, also referred simply to as an engine) to which a particulate filter regeneration apparatus in a first preferred embodiment according to the present invention is applicable. An air cleaner (not shown) is attached onto an air introduction portion of an intake air passage 2 and (powdered) dust in the intake air is eliminated by means of the air cleaner. A compressor portion 3a of a variable nozzle turbo charger (hereinafter, a turbo charger) is attached on a downstream side of the air cleaner. The intake air passed through the air cleaner is compressed and supplied to compressor portion 3a. An intercooler 4 is disposed at a downstream side of compressor portion 3a and the intake air pressurized and supplied from compressor portion 3a is cooled by means of this intercooler 4. Furthermore, a throttle valve 6 is disposed at just an upstream side of surge tank 5 and the cooled intake air is passed through a throttle valve 6 and streamed into surge tank 5 and distributed into each cylinder via an intake manifold.

Injectors 7 are fixed onto a cylinder head of an engine main body so as to be exposed to an approximately center of an upper part of a combustion chamber for each cylinder. A fuel system of engine 1 is constituted so as to include a common rail 8. The fuel pressurized by means of a fuel pump (not shown) is distributed into each injector via a common rail 8. Injectors 7 are activated in response to a fuel injection control signal from an electronic control unit (hereinafter, referred to as an ECU) 21. The fuel injection by means of each injector 7 is carried out a plurality of number of times. Except a main injection to control a torque of engine 1, a pilot injection to decrease a developed particulate and a post injection to raise a temperature of the exhaust gas during a regeneration of Diesel particulate filter 12 as will be described later are carried out by means of injector 7. The pilot injection is carried out by advancing its injection timing angle with respect to the main injection and the post injection is carried out by retarding the timing angle with respect to the main injection.

On the other hand, a turbine portion 3$b$ of a turbo charger 3 is disposed on a downstream side of a manifold in an exhaust passage 9 and a vane angle of a movable vane of turbo charger 3 is controlled in accordance with the driving condition in response to a supercharged pressure control signal from ECU 21. A Diesel particulate filter 12 is disposed as the particulate filter to perform a post processing of the exhaust gas. The particulate is removed from the exhaust gas when the particulate in the exhaust gas passes through Diesel particulate filter (DPF) 12.

In addition, an EGR tube 10 is connected for an exhaust recirculation (hereinafter, referred to as an EGR) between exhaust passage 9 and intake air passage 2 (hereinafter, a surge tank 5). An EGR control valve 11 is interposed in EGR tube 10. EGR control valve 11 is operated by means of EGR control signal from ECU 21 so that an appropriate quantity of exhaust gas in accordance with the opening angle is circulated into intake air passage 2.

The exhaust gas purifying device of engine 1 according to the present invention includes a Diesel particulate filter 12 and ECU 21 constituting its regeneration apparatus and sensors.

Signals to be inputted to ECU (Electronic Control Unit) 21 to regenerate Diesel particulate filter 12 includes sensor signals from sensors 31 and 32 to detect exhaust gas temperature Texhin and Texhout at inlet and outlet portions of Diesel particulate filter 12, respectively, from a sensor 33 to detect a pressure difference ΔPdpf between front and rear portions of Diesel particulate filter 12 (forward-and-rearward pressure difference) of Diesel particulate filter 12, from an airflow meter 34, from a crank angle sensor 35, from an accelerator opening angle sensor 36, and from a vehicle speed sensor 37.

Figure 2:
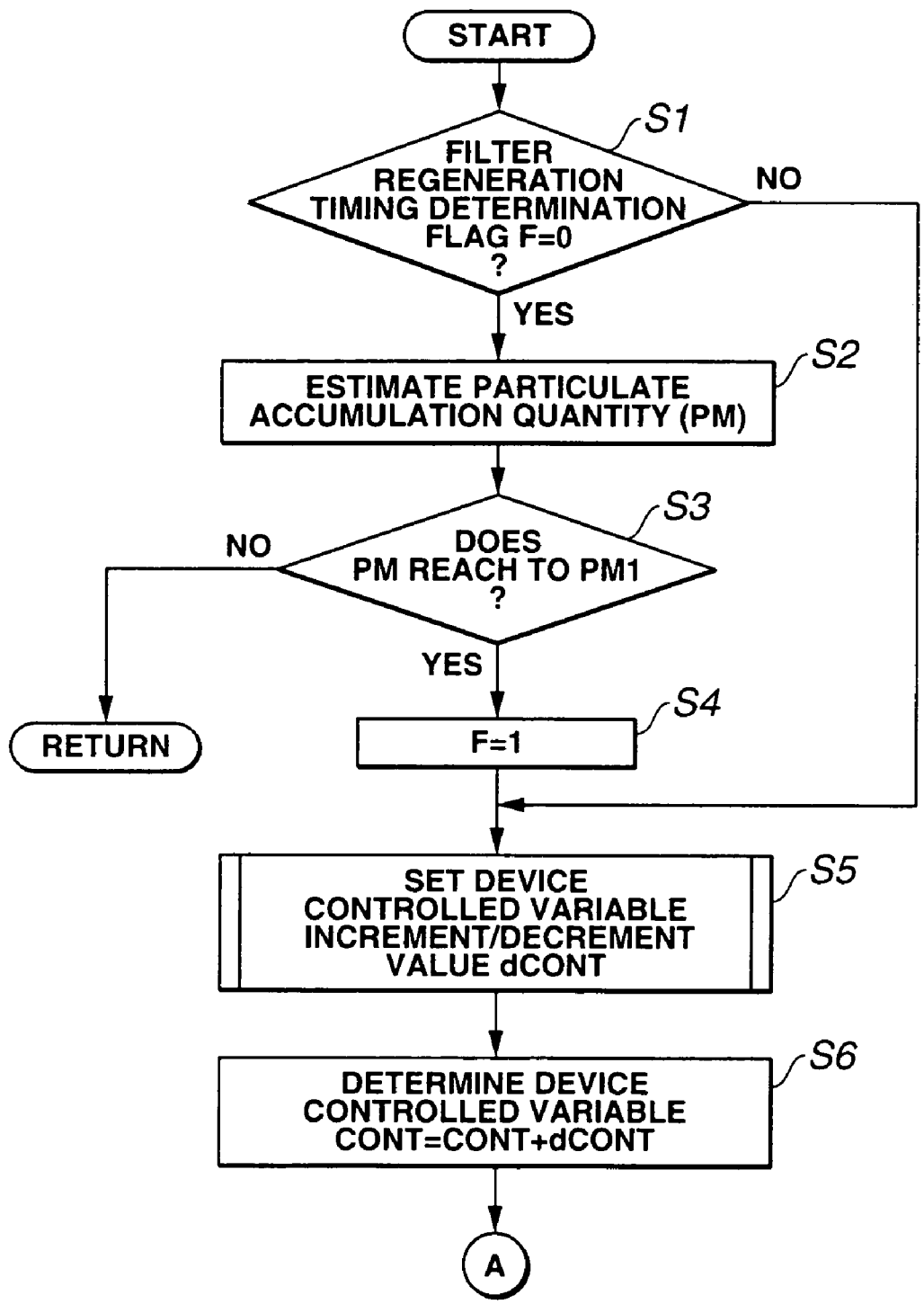
FIG. 2 is an operational flowchart representing a regeneration timing determination and a regeneration mode control routine in the first embodiment shown in FIG. 1.

Next, an operation of ECU 21 related to the regeneration of Diesel particulate filter 12 will be described with reference to operational flowcharts in FIGS. 2, 4, and 5. First, ECU 21 determines whether it is a time for Diesel particulate filter 12 to be regenerated with reference to the flowchart of FIG. 2. Only if ECU 21 determines that it is the time for Diesel particulate filter 12 to be regenerated, the routine advances a step S5. At step S5, ECU 21 performs a control to combust the accumulated particulate. In details, ECU 21 determines whether a regeneration timing determination flag F is zero or not. If ECU 21 determines that this flag≠0 (No), the routine jumps to step S5. Regeneration time determination flag F is set to "0" during a start of engine 1. If Diesel particulate filter 12 is regenerated, flag F is set to "1" during the regeneration process. At step S2, ECU 21 reads filter forward-and-rearward difference pressure ΔPdpf and exhaust gas flow quantity Qexh. A particulate accumulated quantity PM is estimated which is a quantity of the particulate accumulated in Diesel particulate filter 12 from ΔPdpf and Qexh. The estimation of a particulate material (matter) PM is made with respect to a map to which PM is allocated in accordance with ΔPdpf and Qexh. Qexh can be calculated on the basis of intake air flow quantity Qa detected by means of airflow meter 34. At a step S3, ECU 21 determines whether particulate accumulation quantity PM has reached to a prescribed quantity PM1. If particulate accumulation quantity PM has reached to prescribed quantity PM1 at step S3, the routine goes to a step S4. If No (PM does not reach to PM1) at step S3, this routine of FIG. 2 is returned. PM1 indicates a preset upper limit of a particulate allowance accumulation quantity of Diesel Particulate filter 12. Hence, at a time when PM has been reached to PM1, this time is a timing at which Diesel particulate filter 12 should be regenerated. At step S4, regeneration timing determination flag F is set to "1". At steps S5 and S6, a temperature of the exhaust gas is raised in the following way in order to combust the accumulated particulate in Diesel particulate filter 12. The raising of the temperature is carried out to set device controlled variable increment/decrement value dCONT for a predetermined engine control device (hereinafter, referred to as a regeneration time controlled device (step S5). It is noted that dCONT is set in accordance with a flowchart of FIG. 4 as an increment/decrement value of a device controlled variable basic value CONT set for an ordinary engine control. In this embodiment, injectors 7, turbo charger 3, EGR control valve 11, and intake air throttle valve 6 are included as regeneration mode controlled devices. Any one or more of the main injection timing, post injection timing, and a post injection quantity, the vane angle of turbo charger 3, an opening angle of EGR control valve 11, and an opening angle of intake throttle valve 6 are adjusted. It is noted that device controlled variable dCONT and its control contents in a case where the temperature of the exhaust gas is raised are described with reference to TABLE 1.

TABLE 1

| Device | dCONT | Control Contents |
|---|---|---|
| Injector | Main injection timing | Retardation angle |
| | Post injection timing | Retardation angle |
| | Post injection Quantity | Increment |
| Turbo charger | Turbo charge Pressure | Reduction |
| EGR control valve | Opening angle | Valve closure |
| Intake air throttle valve | Opening angle | Valve closure |

Figure 3:
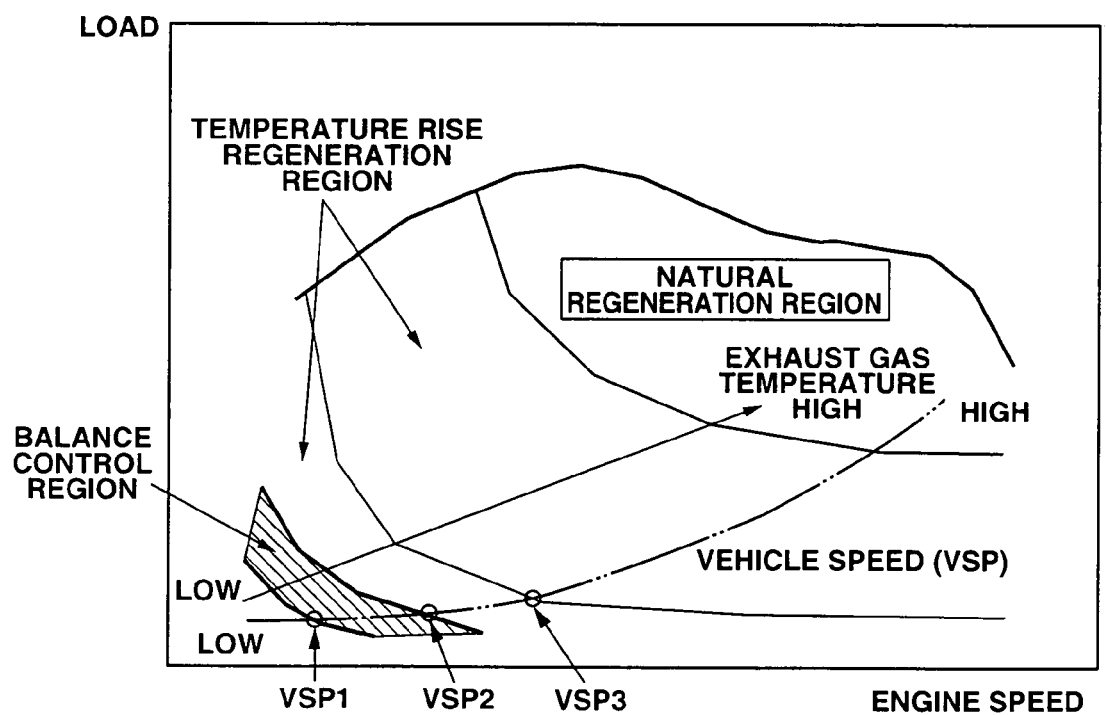
FIG. 3 is a characteristic graph representing a particulate processing in accordance with an engine driving region.

Prior to an explanation of the flowchart of FIG. 4, a target temperature to which the temperature of the exhaust gas is to be reached will be explained with reference to a driving region map of engine 1 shown in FIG. 3.

The driving region of engine 1 is divided into a plurality of regions in accordance with an equivalent exhaust gas (equi-exhaust gas) temperature line (balance control region, temperature rise regeneration region, and a natural regeneration region). A practical driving region of engine 1 in accordance with a vehicular velocity (vehicle speed) VSP is as shown in a dot-and-dot-and-dash line (phantom line) of FIG. 3. The exhaust gas has a tendency that, as the vehicle speed becomes high, namely, as the driving state falls within a high revolution and a high load region, the temperature thereof becomes high. To combust the particulate accumulated onto Diesel particulate filter 12, it is necessary to raise the temperature of exhaust gas at least 350 degrees or higher.

However, in order to further actively combust the particulate and regenerate Diesel particulate filter 12, it is necessary to further raise the temperature thereof at a temperature equal to or higher than 570° C. through 640° C. (570° C. is a criterion temperature to determine whether the regeneration should be carried out for Diesel particulate filter 12). Except a part of the driving regions (natural regeneration region), the temperature of exhaust gas during an ordinary driving is lower than a regeneration temperature. It is necessary to raise the temperature of exhaust gas in order to regenerate Diesel particulate filter 12. While engine 1 falls in a middle or high speed traveling region (temperature rise regeneration region, for example, vehicle speed VSP≧50 Km/h), an operation of the regeneration mode controlled device permits the exhaust gas to raise the temperature thereof to the regeneration temperature (for example, 600° C.). However, during the driving region at a lower vehicle speed side than the above-described vehicle speed, it is not possible to raise the temperature of exhaust gas to such a high temperature as described above. It is, thus, not possible to regenerate Diesel particulate filter 12. Hence, under a driving region at a relatively high vehicle speed side from among the regeneration impossible regions (a balance control region; for example, VSP=30 through 50 Km/h). The exhaust gas is raised to 400° C. through 450° C. so as combust the particulate whose quantity is approximately equal to a quantity of the particulate which flows into particulate filter 12 although Diesel particulate 12 cannot be regenerated.

Figure 4:
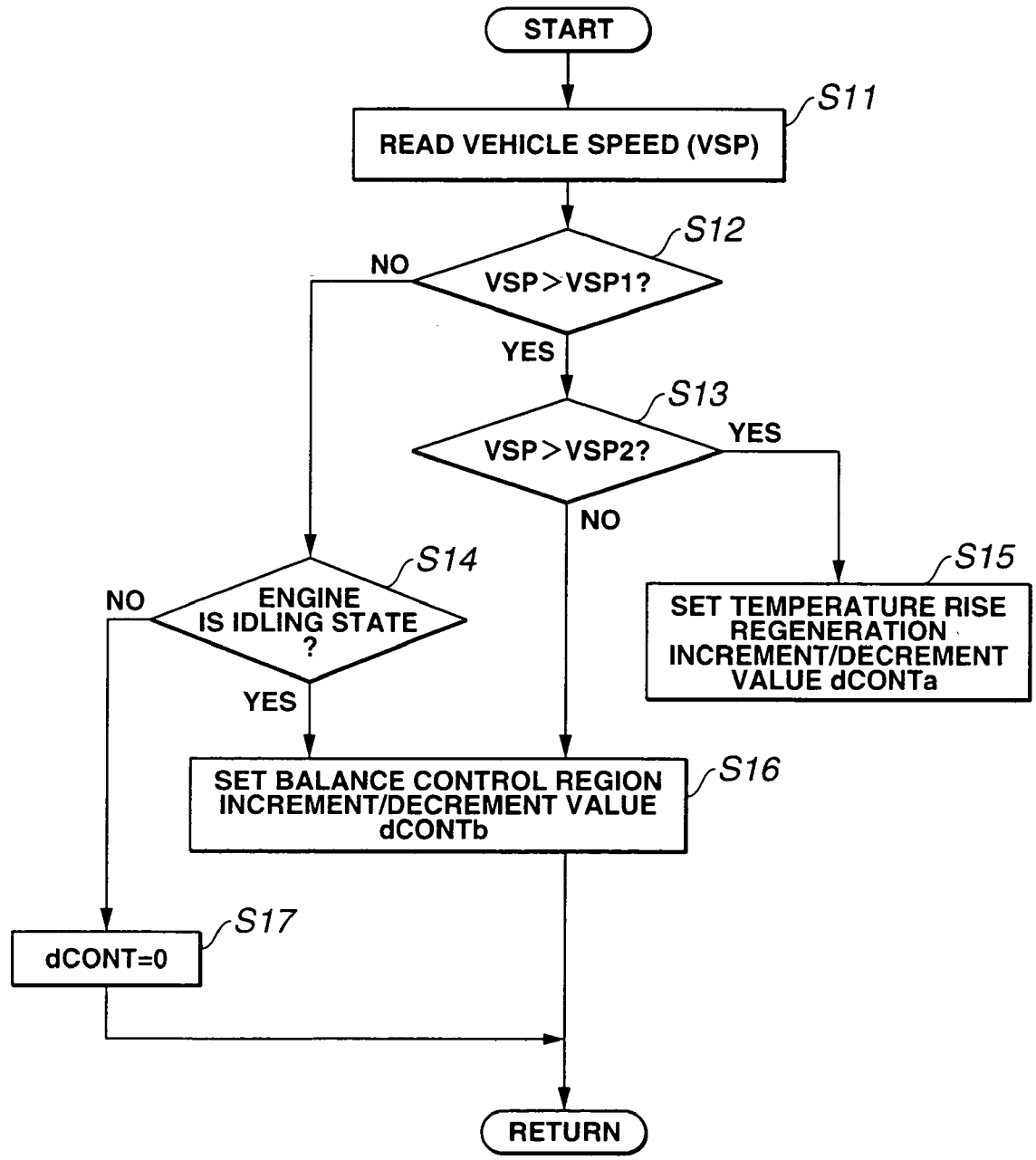
FIG. 4 is an operational flowchart of a device controlled variable increment/decrement value setting routine.

In a flowchart shown in FIG. 4, at a step S11, ECU 21 reads vehicle speed VSP. At step S12, ECU 21 determines whether read vehicle speed VSP is higher than a first prescribed vehicle speed VSP1 (for example, 30 Km/h). If vehicle VSP is higher than first prescribed vehicle speed VSP1 (Yes), the routine goes to a step S13. If vehicle speed VSP is equal to or lower than VSP1 (No) at step S12, the routine goes to a step S14. At step S13, ECU 21 determines if VSP is higher than a second prescribed vehicle speed VSP2 (for example, 50 Km/h) which is set at a higher than VSP1. If vehicle speed VSP is higher than second prescribed vehicle speed VSP2, the routine goes to a step S15. If vehicle speed is equal to or lower than second prescribed vehicle speed VSP2, the routine goes to a step S16. At step S14, ECU 21 determines if engine 1 falls in an idling state. If engine 1 falls in the idling state (Yes S14), the routine goes to a step S16. If ECU 21 determines that engine 1 does not fall in the idling state (No) at step S14, the routine goes to a step S17. At step S14, the routine may go to a step S16 only if a time duration during which the determination that the engine is in the idling state is continued for a predetermined time. At step S15, a temperature rise regeneration (mode) increment/decrement value dCONTa is set as device controlled variable increment/decrement value dCONT. At step S16, balance control region increment/decrement value dCONTb is set as device controlled variable increment/ decrement value dCONT. At step S17, 0 is set to device controlled variable increment/decrement value dCONT (dCONTb nor dCONTa).

Temperature rise regeneration (mode) increment/decrement value dCONTa and balance control region device controlled variable increment/decrement value dCONTb are searched from a map to which these increment/decrement values are allocated in accordance with the engine driving state (for example, fuel injection quantity Tp and engine speed Ne (revolution speed). To which device regeneration mode controlled device dCONTa and dCONTb are set (in the case of a single device and in the case of a plurality of devices) is different according to the engine driving state.

dCONTa is set to actively combust the particulate and set so as to obtain (for example, 600° C.) an exhaust gas temperature at which the particulate is actively combusted and at which Diesel particulate filter 12 can be regenerated. On the other hand, dCONTb is set with respect to the regeneration timing controlled device in accordance with at least one regeneration mode controlled device so as to obtain, for example, 450° C. as an exhaust gas temperature at which the particulate whose quantity is approximately the same as a quantity of the particulate which flows into Diesel particulate filter 12 can be combusted. These values dCONTa and dCONTb are set for at least one or a plurality of regeneration mode controlled devices in accordance with the driving condition.

It is noted that dCONTb is distinguishably set at step S16 of FIG. 4 in a case where engine 1 falls in an idling state and vehicle speed VSP falls in a range from VSP1 to VSP2. That is to say, in a case where intake air throttle valve 6 is adopted as the regeneration mode controlled device, these values are set to mutually different values (the opening angles of intake air throttle valve 6 are set differently).

In the flowchart of FIG. 2, ECU 21 adds device controlled variable increment/decrement value dCONT (dCONTa, dCONTb, or 0) to a device controlled variable basic value CONT to obtain a final device controlled variable CONT (=CONT+dCONT) at step S6.

Figure 5:
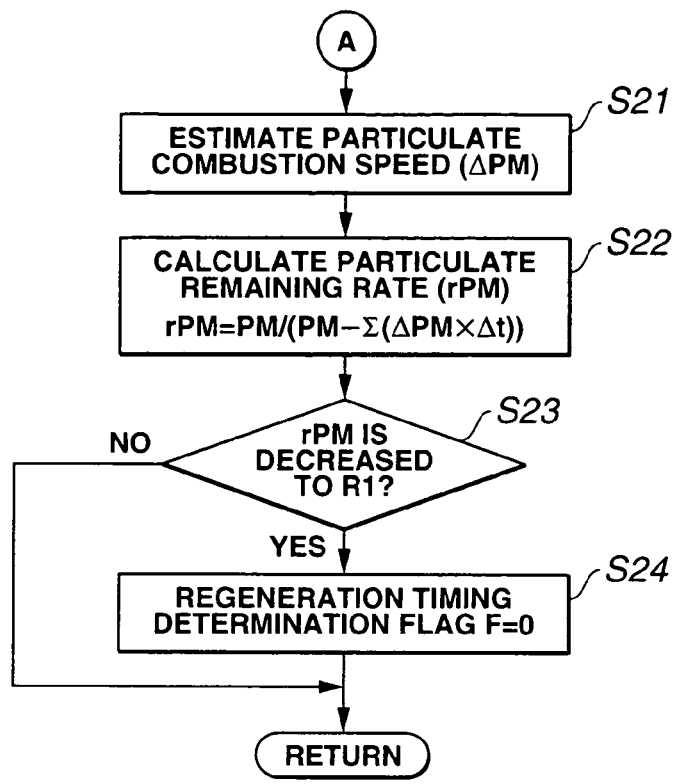
FIG. 5 is a flowchart representing a device controlled variable increment/decrement value setting routine.

Together with the combustion of the particulate accumulated into Diesel particulate filter 12 in the way as described above, ECU 21 determines, in accordance with a flowchart of FIG. 5, that the regeneration has been completed.

That is to say, at a step S21, ECU 21 reads an exhaust gas flow quantity Qexh and a temperature of Diesel particulate filter 12 (hereinafter, referred also to as a filter temperature) Tdpf. Particulate combustion temperature velocity ΔPM (a quantity corresponding to the particulate combustion per unit time from these Qexh and Tdpf. The estimation of ΔPM is allocated in accordance with Qexh and Tdpf. Filter temperature Tdpf is derived by calculating an average of exhaust gas temperatures Texhin and Texhout at inlet and outlet portions of Diesel particulate filter 12 (Tdpf=k× (Texhin+Texhout)/2, wherein k denotes a coefficient). At a step S22, ECU 21 calculates particulate remaining rate rPM in Diesel particulate filter 12. It is noted that rPM subtracts the quantity of particulate combusted from particulate accumulation quantity PM estimated at step S1 and subtracts PM from the subtracted result (rPM=PM/(PM−Σ(ΔPM×Δt)), wherein Δt denotes a calculation period). At step S23, ECU 21 determines whether rPM is subtracted by a prescribed value R1. If subtracted into R1 at step S23, the routine goes to a step S24. If not subtracted into R1 at step S23, the present routine is ended. It is noted that R1 is present since the particulate is sufficiently decreased and Diesel particulate filter 12 is regenerated. At a step S24, 0 is set to regeneration timing determination flag F. Then, due to the subsequent processing, the exhaust gas is recovered to the ordinary temperature.

Figure 6:
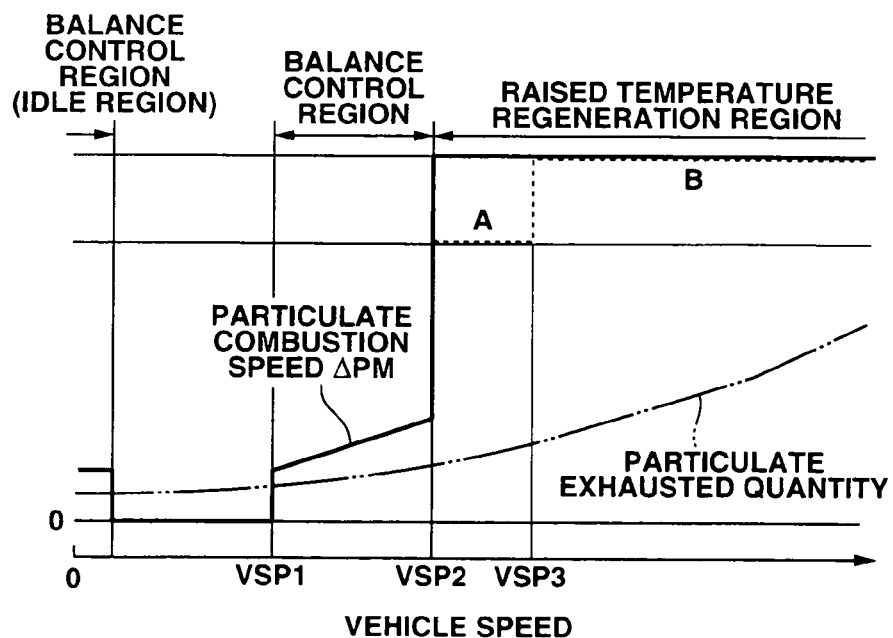
FIG. 6 is a characteristic graph representing a relationship between a particulate combustion speed ΔPM and a vehicle speed VSP.

Next, the above operation will be described with reference to FIG. 6 representing a relationship between particulate combustion speed ΔPM and vehicle speed VSP. The particulate exhausted from engine 1 is continuously accumulated into Diesel particulate filter 12. Particulate accumulation quantity PM estimated from Filter forward-and-rearward difference pressure ΔPdpf and exhaust gas flow quantity Qexh has reached to the prescribed quantity PM1. When ECU 21 determines that it is the time to regenerate Diesel particulate filter 12, ECU 21 sets device controlled quantity increment/decrement value dCONT (dCONTa or dCONTb) to raise the temperature of the exhaust gas in accordance with the driving state of engine 1 at that time.

That is to say, when engine 1 falls in a low vehicle speed traveling region of VSP=30 Km/h through 50 Km/h, ECU 21 sets balance control region increment/decrement value dCONTb as dCONT to raise the temperature of exhaust gas to 450° C. Thereby, particulate combustion speed ΔPM becomes substantially equal to the quantity of particulate which flows into Diesel particulate filter 12 within a unit of time. On the other hand, if engine 1 falls in a middle or high speed traveling region (except natural regeneration region) higher than 50 Km/h, ECU 21 sets temperature rise regeneration mode increment/decrement value dCONTa as dCONT. Thus, the temperature of the exhaust gas is raised to 600° C. Thus, since the accumulated particulate becomes actively combusted and is gradually decreased with respect to time. Diesel particulate filter 12 is regenerated. In the temperature rise region, temperature of the exhaust gas may be raised to a plurality of target temperatures in a stepwise manner. That is to say, in a region A (refer to FIG. 6) in which the vehicular velocity (VSP) falls in a region A in which the vehicular velocity VSP is relatively low speed region of 50 Km/h through 60 Km/h, the exhaust gas temperature is raised to a single target temperature (for example, 570° C.). On the other hand, in a region B (refer to FIG. 6) at a high vehicle speed, the temperature of the exhaust gas is, at first, raised up to a relatively low target temperature (for example, 570° C.). Thereafter, when the particulate is combusted and the regeneration is advanced to some degree. At this time, the temperature of exhaust gas is raised up to a higher target temperature (for example, 640° C.) than the above relatively low target temperature. It is noted that, when engine 1 falls in the natural regeneration region, the particulate is combusted by means of the heating that the exhaust gas naturally has even if the control to raise the temperature of exhaust gas is not carried out and its accumulation quantity can be decreased.

In this embodiment, steps S2 and S3 in the flowchart of FIG. 2 correspond to regeneration timing determination means (section), steps S5 and S6 in the same flowchart correspond to regeneration timing (or mode) controlling section (means), step S15 of the flowchart shown in FIG. 4 corresponds to first exhaust gas temperature raising section (means), and step S16 of the same flowchart corresponds to second exhaust gas temperature raising section (means).

The following advantages can be obtained according to the embodiment described above. First, when the particulate accumulated on Diesel particulate filter 12 has reached to prescribed quantity PM1 and engine 1 falls in the temperature rising regeneration region, the exhaust gas temperature is raised up to a high temperature such as 600° C. Hence, the active combustion of the particulate is carried out so that Diesel particulate filter 12 can be regenerated.

On the other hand, when engine 1 is in the balance control region, the exhaust gas temperature can be raised. Although Diesel particulate filter 12 cannot be regenerated, the exhaust gas can be raised to 450° C. Thus, the quantity of the particulate which flows into Diesel particulate filter 12 is combusted and removed whenever the exhaust gas flows into Diesel particulate filter 12. Thus, the further accumulation of the particulate can be suppressed. Hence, at a time point at which it is the timing at which the regeneration timing has been arrived, not only engine 1 falls in the balance control region but also engine 1 is transferred to the balance control region in a midway through the regeneration, the particulate can continuously been combusted. Hence, the accumulated particulate is suppressed to the allowance quantity and an excessive rise in the exhaust gas pressure is prevented. Together with this advantage, when the temperature of the exhaust gas is raised after the excessive rise in the exhaust gas pressure, Diesel particulate filter 12 can be protected from a thermal load.

In addition, in the balance control region, a temperature raise of the exhaust gas to the target temperature (in this embodiment, 450° C.) can be reduced as compared with a case where the particulate is tried to be actively combusted. Hence, in a case where, to raise the temperature of the exhaust gas, the injection timing of the post injection is retarded, a retardation quantity (the retardation angle is small) is lessened. Consequently, the injected fuel cannot be mixed into the lubricating oil.

Figure 7:
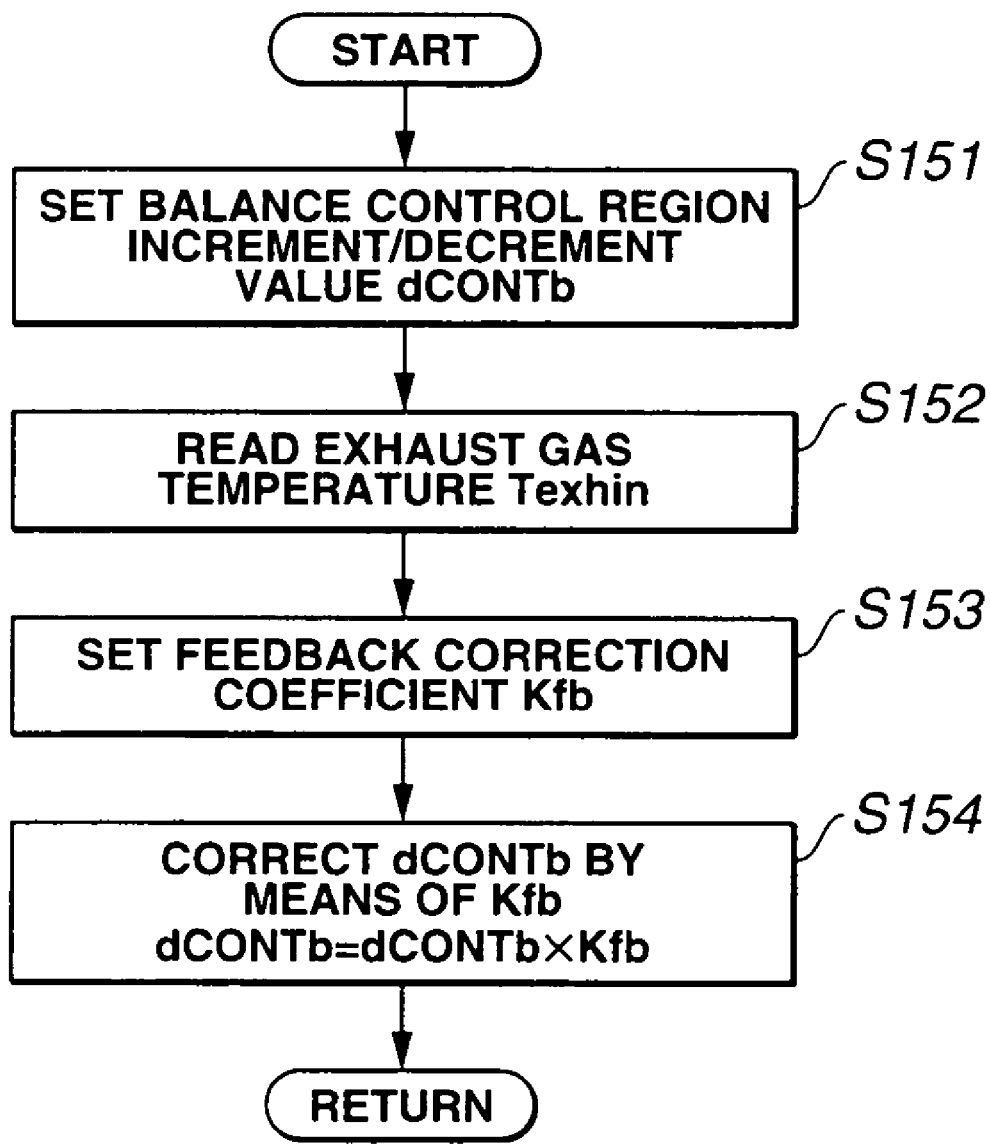
FIG. 7 is an operational flowchart representing a regeneration mode control routine in a second preferred embodiment according to the present invention.

As a second preferred embodiment according to the present invention, step S16 of the flowchart of FIG. 4 may be replaced with the whole flowchart shown in FIG. 7, a difference between the target temperature and actual exhaust gas temperature is calculated so that such a feedback control that the exhaust gas temperature is made coincident with the target temperature may be carried out.

In details, at a step S151, in the same manner as described with reference to step S16 in the flowchart of FIG. 4, ECU 21 sets a balance control region increment/decrement value dCONTb during the balance control mode increment/decrement value dCONTb. At a step S152, ECU 21 reads temperature Texhin of the exhaust gas at the filter inlet portion. At a step S153, ECU 21 sets a feedback correction coefficient Kfb in accordance with a difference between target temperature tTexh (for example, 450° C. described above) and Texhin. Kfb is set to "1" when tTexh is made coincident with Texin. As a difference (=tTexh−Texhin) becomes larger, Kfb is set as a larger value (provided that it is larger than zero). At a step S154, ECU 21 corrects balance control region controlled variable dCONTb by multiplying balance control region increment/decrement value dCONTb with Kfb (dCONTb=dCONTb×Kfb).

In the second embodiment, the whole flowchart of FIG. 7 constitutes second exhaust gas temperature raising means (section). Such a feedback function as described above is provided with the regeneration apparatus of Diesel particulate filter 12. Thus, the exhaust gas can accurately be raised to the target temperature. It is noted that, in the same way as in the temperature rise regeneration region, the temperature of the exhaust gas can be feedback controlled. It is also noted that ECU 21 includes a microcomputer having a CPU (Central Processing Unit), a ROM (Read Only Memory), a RAM (Random Access Memory), an Input port, an Output Port, common bus, and so forth and a longitudinal axis of FIG. 3 denotes an engine load and a lateral axis of FIG. 3 denotes the engine speed.

The entire contents of a Japanese Patent Application No. 2003-004965 (filed in Japan on Jan. 10, 2003) are herein incorporated by reference. The scope of the invention is defined with reference to the following claims.

What is claimed is:

1. A regeneration apparatus for a particulate filter that collects a particulate in exhaust gas of an internal combustion engine, the regeneration apparatus comprising:
  a regeneration timing determining section that determines a timing at which an accumulated particulate is combusted to regenerate the particulate filter; and
  a regeneration mode controlling section that performs a control for a combustion of the particulate; the regeneration mode controlling section including: a first exhaust gas temperature raising section that raises a temperature of the engine exhaust gas to a first target temperature set at a temperature equal to or higher than a criterion temperature which provides a criterion of whether the particulate is combusted to regenerate the particulate filter when the engine falls in a first driving region; and a second exhaust gas temperature raising section that raises the engine exhaust gas temperature to a second target temperature set at a temperature lower than the criterion temperature when the engine falls in a second driving region different from the first driving region, and wherein the second target temperature is a temperature of the engine exhaust gas to combust the particulate whose quantity is approximately equal to a quantity of the particulate which flows into the particulate filter.

2. A regeneration apparatus for a particulate filter that collects a particulate in exhaust gas of an internal combustion engine, the regeneration apparatus comprising:

a regeneration timing determining section that determines a timing at which an accumulated particulate is combusted to regenerate the particulate filter; and a regeneration mode controlling section that performs a control for a combustion of the particulate, the regeneration mode controlling section including: a first exhaust gas temperature raising section that raises an exhaust gas temperature to a first target temperature set at a temperature to combust the particulate to decrease an accumulation quantity of the particulate in the particulate filter when the engine falls in a first driving region; and a second exhaust gas temperature raising section that raises the exhaust gas temperature to a second target temperature set at a temperature to combust the particulate whose quantity is approximately the same as a quantity of the particulate which flows into the particulate filter when the engine falls in a second driving region different from the first driving region.

3. A regeneration apparatus for a particulate filter that collects a particulate in exhaust gas of an internal combustion engine as claimed in claim 2, wherein the second driving region is a driving region located at a lower vehicle speed side than the first driving region.

4. A regeneration apparatus for a particulate filter that collects a particulate in exhaust gas of an internal combustion engine as claimed in claim 2, wherein the second exhaust gas temperature raising section includes: a detection section that detects an exhaust gas temperature; and an exhaust gas temperature controlling section that controls the exhaust gas temperature on the basis of the detected exhaust gas temperature and the second target temperature.

5. A regeneration apparatus for a particulate filter that collects a particulate in exhaust gas of an internal combustion engine as claimed in claim 2, wherein the second exhaust gas temperature raising section raises the engine exhaust gas temperature to the second target temperature by adjusting at least one of a fuel injection timing of a main injection through each of fuel injectors to control an engine torque, another fuel injection timing of a post injection and an injection quantity of the post injection carried out by retarding the injection timing from the main injection, a turbo charged pressure of a turbo charger, an exhaust gas recirculation quantity (EGR quantity) from an exhaust passage of the engine to an intake air passage thereof, and an opening area of the intake air passage.

6. A regeneration apparatus for a particulate filter that collects a particulate in exhaust gas of an internal combustion engine as claimed in claim 2, wherein the regeneration timing determining section comprises: a particulate accumulation quantity estimating section that estimates an accumulation quantity (PM) of the particulate in the particulate filter on the basis of a filter forward-and-rearward difference pressure ($\Delta Pdf$) and exhaust gas flowing quantity (Qexh); and a particulate accumulation quantity determining section that determines whether the particulate accumulation quantity is increased and reached to a prescribed quantity (PM1) and wherein the regeneration timing determining section determines the timing at which the accumulated particulate in the particulate filter is combusted to regenerate the particulate filter when the particulate accumulation quantity determining section determines that the accumulated particulate has reached to the prescribed quantity (PM1).

7. A regeneration apparatus for a particulate filter that collects a particulate in exhaust gas of an internal combustion engine as claimed in claim 6, wherein the regeneration apparatus further comprises a vehicle speed detection section that detects the vehicle speed (VSP); and an engine driving region determining section that determines one of which of the first and second engine driving regions the engine falls on the basis of the vehicle speed.

8. A regeneration apparatus for a particulate filter that collects a particulate in exhaust gas of an internal combustion engine as claimed in claim 7, wherein the engine is determined to fall in the second driving region including a predetermined low vehicle speed region, the regeneration controlling section sets a device controlled variable increment/decrement value (dCONTb) during a balance control region which corresponds to the predetermined low vehicle speed region for at least one regeneration mode controlled device of the engine to obtain the exhaust gas temperature at which the particulate whose quantity is approximately the same as the quantity of the particulate which flows into the particulate filter is enabled to be combusted.

9. A regeneration apparatus for a particulate filter that collects a particulate in exhaust gas of an internal combustion engine as claimed in claim 2, wherein the second exhaust gas temperature raising section comprises: a balance control region controlled variable increment/decrement value setting section that sets a device controlled variable increment/decrement value (dCONTb) of at least one controlled device during the engine balance control region to obtain the second target temperature in accordance with the engine driving state when the engine falls in the second driving region including the balance control region; an exhaust gas temperature detecting section that detects an exhaust gas temperature (Texhin) at an inlet portion of the particulate filter; a feedback correction coefficient setting section that sets a feedback correction coefficient (Kfb) in accordance with a difference between the exhaust gas temperature (Texhin) and the second target temperature (tTexh); and a controlled variable increment/decrement value correcting section that corrects the controlled variable increment/decrement value (dCONTb) with the feedback correction coefficient (Kfb).

10. A regeneration apparatus for a particulate filter that collects a particulate in exhaust gas of an internal combustion engine as claimed in claim 9, wherein the correction coefficient (Kfb) is one when the difference between the exhaust gas temperature (Texhin) and the second target temperature is zero and as the difference becomes larger, the feedback correction coefficient (Kib) becomes larger.

11. A regeneration method for a particulate filter that collects a particulate in exhaust gas of an internal combustion engine, the regeneration method comprising:

determining a timing at which an accumulated particulate is combusted to regenerate the particulate filter; and performing a control for a combustion of the particulate, the performing of the control of the combustion of the particulate including: raising an exhaust gas temperature to a first target temperature set at a temperature to combust the particulate to decrease an accumulation quantity of the particulate in the particulate filter when the engine falls in a first driving region; and raising the exhaust gas temperature to a second target temperature set at a temperature to combust the particulate whose quantity is approximately the same as a quantity of the particulate which flows into the particulate filter when the engine falls in a second driving region different from the first driving region.

12. An exhaust gas purifying device for an internal combustion engine, comprising:
   a particulate filter, disposed within an exhaust passage of the engine, to collect a particulate in exhaust gas of the engine; and
   a regeneration apparatus to regenerate the particulate filter, the regeneration apparatus comprising:
   a regeneration timing determining section that determines a timing at which an accumulated particulate is combusted to regenerate the particulate filter; and
   a regeneration mode controlling section that performs a control for a combustion of the particulate, the regeneration mode controlling section including: a first exhaust gas temperature raising section that raises a temperature of the engine exhaust gas to a first target temperature set at a temperature equal to or higher than a criterion temperature which provides a criterion of whether the particulate is combusted to regenerate the particulate filter when the engine falls in a first driving region; and a second exhaust gas temperature raising section that raises the engine exhaust gas temperature to a second target temperature set at a temperature lower than the criterion temperature when the engine falls in a second driving region different from the first driving region, and wherein the second target temperature is a temperature at which the particulate whose quantity is approximately the same as a quantity of the particulate which flows into the particulate filter is combusted.

13. An exhaust gas purifying device for an internal combustion engine, comprising:
   a particulate filter, disposed within an exhaust passage of the engine, to collect a particulate in exhaust gas of the engine; and
   a regeneration apparatus to regenerate the particulate filter, the regeneration apparatus comprising:
   a first exhaust gas temperature raising section that raises an exhaust gas temperature to a first target temperature set at. a temperature to combust the particulate to decrease an accumulation quantity of the particulate in the particulate filter when the engine falls in a first driving region; and
   a second exhaust gas temperature raising section that raises the exhaust gas temperature to a second target temperature set at a temperature to combust the particulate whose quantity is approximately the same as a quantity of the particulate which flows into the particulate filter when the engine falls in a second driving region different from the first driving region.

14. An exhaust gas purifying device for an internal combustion engine as claimed in claim 13, wherein the second driving region is a driving region of the engine located at a lower vehicle speed side than the first driving region.

15. An exhaust gas purifying device for an internal combustion engine as claimed in claim 13, wherein the exhaust gas temperature raising section includes: a detection section that detects an exhaust gas temperature; and an exhaust gas temperature controlling section that controls the exhaust gas temperature on the basis of the detected exhaust gas temperature and the second target temperature.

16. An exhaust gas purifying device for an internal combustion engine as claimed in claim 13, wherein the second exhaust gas temperature raising section raises the engine exhaust gas temperature to the second target temperature by adjusting at least one of a fuel injection timing of a main injection through each of fuel injectors to control an engine torque, another fuel injection timing of a post injection and an injection quantity of the post injection, the post injection being carried out by retarding the injection timing from the main injection, a turbo charged pressure of a turbo charger, an exhaust gas recirculation quantity from an exhaust passage of the engine to an intake air passage thereof, and an opening area of the intake air passage.

* * * * *